United States Patent [19]
Sasaki et al.

[11] Patent Number: 5,353,736
[45] Date of Patent: Oct. 11, 1994

[54] INSTRUMENT FOR VEHICLE

[75] Inventors: Kazuyuki Sasaki; Yoshihiro Tsuji, both of Shizuoka, Japan

[73] Assignee: Yazaki Corporation, Tokyo, Japan

[21] Appl. No.: 947,483

[22] Filed: Sep. 21, 1992

[30] Foreign Application Priority Data

Sep. 26, 1991 [JP] Japan .............................. 3-077978[U]
Feb. 19, 1992 [JP] Japan .............................. 4-006736[U]

[51] Int. Cl.$^5$ ........................................... G01D 11/26
[52] U.S. Cl. ................................. 116/304; 359/837
[58] Field of Search .................. 116/62.1, 284, 304, 116/DIG. 45; 359/514, 601, 609, 613, 614, 831, 837

[56] References Cited
U.S. PATENT DOCUMENTS

| | | | |
|---|---|---|---|
| 3,590,773 | 7/1971 | Ruppert | 116/284 X |
| 3,887,791 | 6/1975 | Kitchens | 359/609 X |
| 4,756,603 | 7/1988 | Ohtani | 359/601 |
| 4,802,737 | 2/1989 | Denton | 359/609 X |

FOREIGN PATENT DOCUMENTS

| | | | |
|---|---|---|---|
| 2640231 | 12/1977 | Fed. Rep. of Germany | 359/614 |
| 56-122913 | 9/1981 | Japan . | |
| 56-133701 | 10/1981 | Japan . | |
| 60-133317 | 7/1985 | Japan . | |
| 156001 | 7/1986 | Japan | 359/837 |
| 61-172016 | 8/1986 | Japan . | |
| 61-172017 | 8/1986 | Japan . | |

*Primary Examiner*—William A. Cuchlinski, Jr.
*Assistant Examiner*—Willie Morris Worth
*Attorney, Agent, or Firm*—Armstrong, Westerman, Hattori, McLeland & Naughton

[57] ABSTRACT

This invention relates to an instrument for a vehicle in which a front cover is attached to a front face of an instrument case for protecting inside of the instrument. An instrument for a vehicle according to the present invention comprising: a meter; a case for accommodating the meter; and a prism disposed at a front portion of the case for regulating amount of light which is emitted from the prism upward by bending light emitted from the meter downward, the prism also acting as a front cover of the case.

17 Claims, 8 Drawing Sheets

23c (DARK PAINT)

INSTRUMENT FOR VEHICLE

BACKGROUND OF THE INVENTION

1. Field of the Invention

This invention relates to an instrument for a vehicle and more particularly to an instrument for a vehicle in which a front cover is attached to a front face of an instrument case for protecting inside of the instrument.

2. Description of the Prior Art

As an instrument for a vehicle, an instrument mounted on a dashboard 1 has been used in which a display face thereof is directed to a driver as shown in FIG. 13. This type of meter 2 is not provided with a hood in consideration of the space for the meter, and a front cover 3 made of glass or the like is usually attached to the meter 2 to protect inside of the meter.

In the meter described above, when external light falls on the driver in the daytime, the light reflects on the driver and enters the meter 2. Approximately 4% to 6% of the light reflect on a front face and a rear face of the driver and enters the eyes of the driver, which causes the recognizability of the meter 2 to be decreased since the driver's image reflects on the front face 3 thereof. To eliminate this problem, a surface of the front cover 3 may be formed to have an irregular face, so that a diffused reflection causes the rate of the light which enters the driver's eyes to be decreased.

Meanwhile, when the meter is mounted in the vicinity of a lower portion of the windshield 4, illumination For a dial 2a and the like at night cause light for the illumination to reflect on the windshield 4 and to reach the driver's eyes, as illustrated in FIG. 14, resulting in poor recognizability of viewfield of the driver. To avoid this problem, it is well known that many louvers 3' with dark color are horizontally arranged in a glass or a plastic material to form the front cover 3. With the front cover 3, light from the meter 2 directing upward is interrupted to maintain favorable viewfield.

SUMMARY OF THE INVENTION

With the front cover 3 having the irregular face for eliminating the driver's image described above, however, light from the face of the dial of the meter 2 is also scattered, resulting in poor recognizability of the dial face. Further, in case that the front cover 3 with the louvers are used for protecting reflection on the windshield at night, the dial face 2a becomes dark in daytime, which reduces the recognizability of the dial face 2a.

The present invention has been made to eliminate the drawbacks described above and it is therefore the object of the present invention to provide an instrument for a vehicle in which reflection on the front face of the instrument in the daytime is decreased and reflection on the windshield at night is eliminated.

The instrument for a vehicle according to the present invention comprises: a meter; a case for accommodating said meter; and a prism disposed at a front portion of said case for regulating amount of light which is emitted from said prism upward by bending light emitted from said meter downward, said prism also acting as a front cover of said case.

Further, another object of the present invention is to provide an instrument for a vehicle described above in which upper and lower portions of the prism are formed as flat plates.

It is a further object of the present invention to provide an instrument for a vehicle in which a surface of the prism is inclined with an upper portion thereof being nearer a driver.

It is a further object of the present invention to provide an instrument for a vehicle in which front and rear faces of the prism are spherical with centers on side of a driver and thickness of the prism is increased as descending from an upper portion to a lower portion thereof.

It is a further object of the present invention to provide an instrument for a vehicle which is mounted on a flat plate and in which a surface of the flat plate opposing said front cover of the case is made of material with a good light absorbance.

It is a further object of the present invention to provide an instrument for a vehicle in which the meter comprises a dial, a pointer disposed on the dial, and a movement for driving the pointer, and a hole is formed at a central portion of the prism from a rear face to a front face thereof to accommodate the movement.

It is a further object of the present invention to provide an instrument for a vehicle in which a bottom face of said prism is painted dark or reflection protecting films are applied to front and rear faces of the prism.

BRIEF DESCRIPTION OF THE DRAWINGS

The present invention will be more apparent from the following description with reference to the accompanying drawings wherein.

DETAILED DESCRIPTION OF PREFERRED EMBODIMENTS

Now, an embodiment of the present invention will be explained with reference to drawings.

Figure 1:
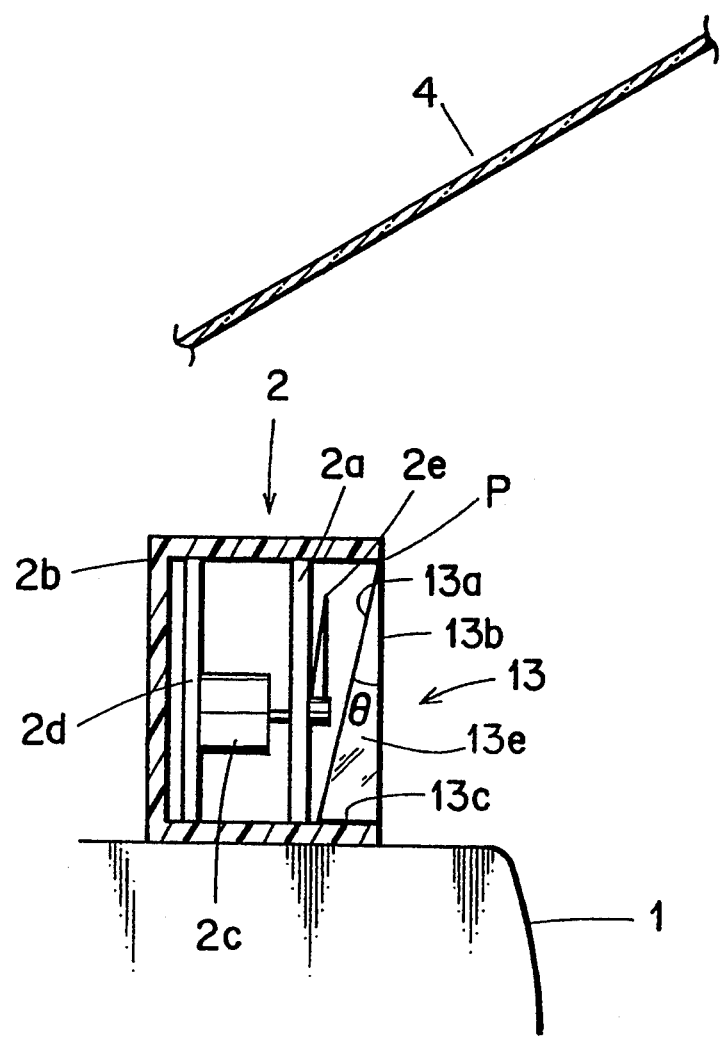
FIG. 1 shows an instrument for a vehicle according to an embodiment of the present invention which is mounted on a dashboard.

FIG. 1 shows an instrument of a vehicle according to the first embodiment of the present invention mounted on a dashboard 1 which is located below a windshield 4 in front of a driver's seat. The instrument is provided with an instrument case 2b having a cross section of the letter U, in which a dial 2a is inserted. On a front face of the dial 2a is disposed a pointer 2e, which is fixed to a pointer shaft extending through a hole of the dial 2a. Further, the pointer shaft extends from a movement 2c mounted on a circuit board 2d which is ranged behind the dial 2a. When a signal enters the movement 2C, the pointer shaft rotates to cause the pointer 2e to indicate characters or the like on the dial 2a according to the signal.

Figure 2:
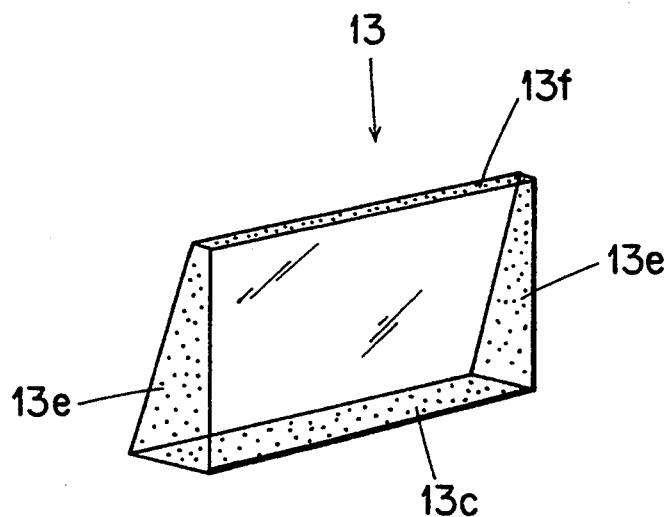
FIG. 2 is a perspective view of a prism according to the embodiment.

Further, into an opening of the instrument case 2b is inserted a front cover 13, which is made of a prism with a triangular cross section. The prism 13 is disposed in such a manner that an apex thereof directs upward and is inclined such that a rear face 13a thereof approaches the dial 2a of the meter 2 from the apex having an apex angle of $\theta$ toward a lower portion of the dial 2a. A front face 13b of the prism 13 is arranged substantially in parallel to the face of the dial As illustrated in FIG. 2, the bottom face 13c of the prism, which is opposed to the apex of the prism 13, both sides 13e, and upper face 13f of the prism 13, that is, other faces except for the rear face 13a and the front face 13b of the prism are painted dark. Further, the rear face 13a and the front face 13b are provided with reflection protecting films not shown which are used for cameras, glasses, or the like. The reflection protecting films may be formed directly on the prism 13 through evaporation. However, the same effect is obtained when sticky reflection protecting sheets may be applied to the faces.

Figure 3:
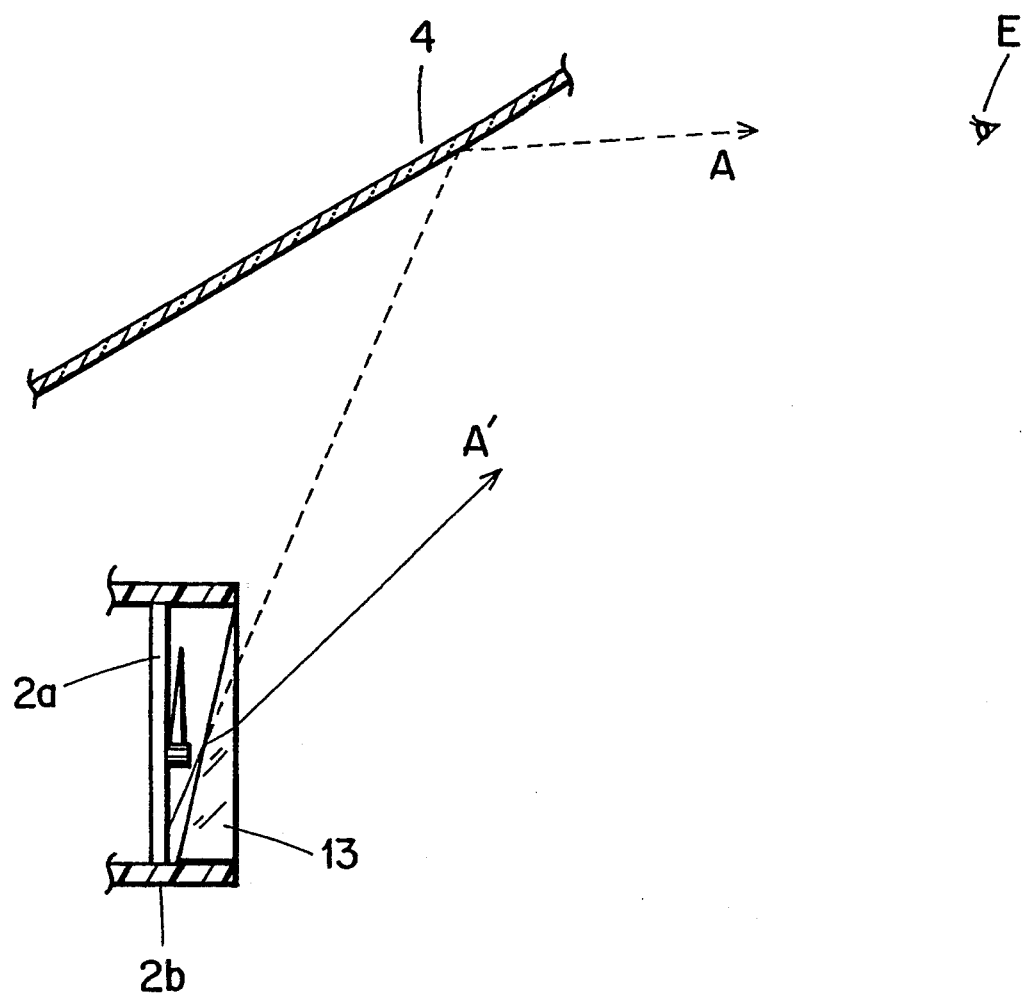
FIG. 3 is a drawing for explaining the condition in which light emitted from a dial is bent downward.

As described above, the arrangement of the front cover 13 in front of the dial 2a of the meter 2 causes the light A, which is emitted from the dial 2 and reflected on the windshield 4 located above the dial 2a to reach the driver's eyes, to be bent as shown in FIG. 3. As a result, even though the dial 2a is illuminated at night, the light for the illumination is not reflected on the windshield 4 so that the light does not reach the driver's eyes, which prevents the condition in which a display image is reflected on the windshield to interrupt driver's viewfield. Further, the use of the prism prevents the light from being reduced in daytime, which is generated when the louvers are used. Therefore, the quality of the image does not become poor, that is, the image does not become dark in daytime.

Further, even when light reflected from the driver who is in front of the meter 2 enters the prism 13, the reflection protecting films fixed to the front face 13b and the rear face 13a of the prism 13 prevent the light from being reflected, which prevents the driver's image being recognized on the prism 13. Providing an irregular face to the reflection protecting film through matte treatment or the like causes the recognizability of the dial 2a to be decreased but the effect of the reflection protecting to be increased.

Figure 4:
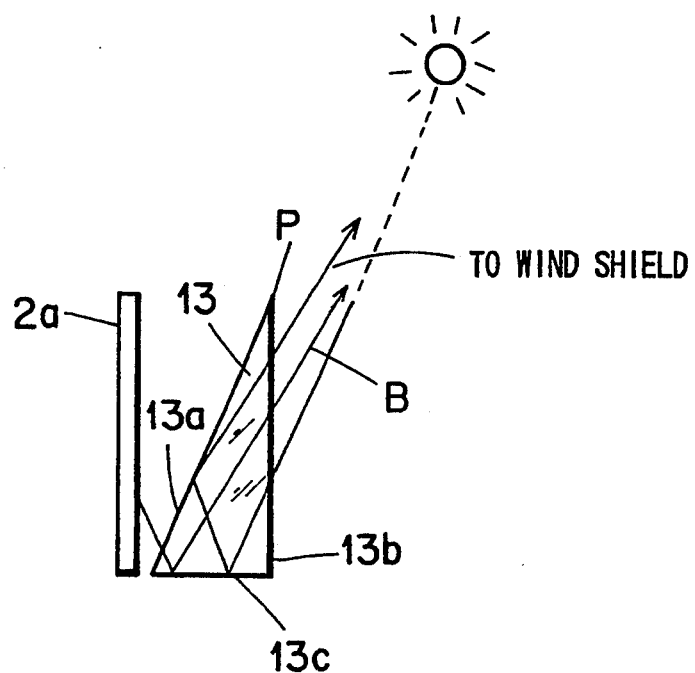
FIG. 4 is a drawing for explaining the condition in which external light which enters the prism reaches the driver through repeated reflection.

As shown in FIG. 4, when external light with large vertical angle such as sun light falls on the prism 13, light passing through the surface 13b is reflected on the bottom face 13c and is further reflected on the rear face 13a to pass the surface 13b. The light reaches the windshield 4 and is reflected there to reach the eyes E of driver, which also becomes an eyesore for the driver. However, the light falling on the prism 13 is absorbed there due to dark painting applied to the bottom face 13c of the prism 13, which prevents the light described above optical path from being generated. At the same time, the optical path B of the light, which is emitted from the dial 2a and is reflection the bottom face 13c of the prism 13 to pass the surface 13b of the prism 13 and to reach the driver's eyes after reflected on the windshield 4, is not actually generated since the light is absorbed on the bottom face painted dark.

Figure 5:
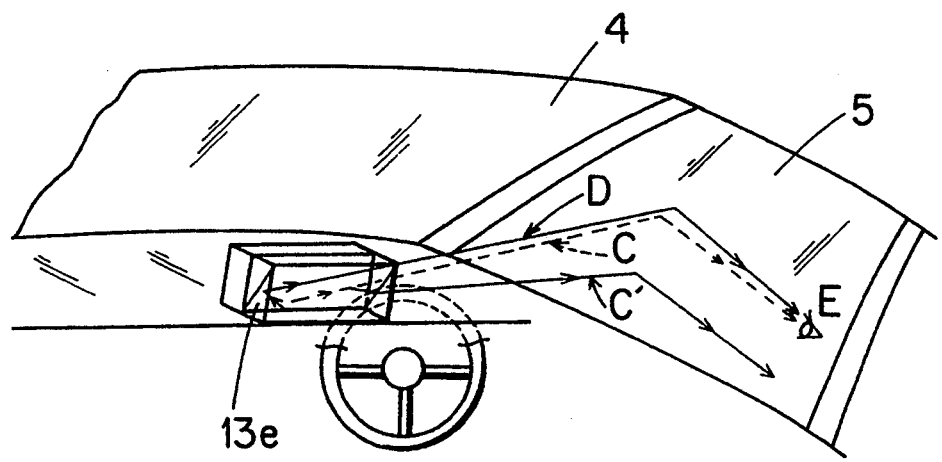
FIG. 5 is a drawing showing an optical path of light which are emitted from the dial reaches the driver's eyes after reflected on side windshield.

A part of light C emitted from the dial 2a, which reaches the eyes of the driver after reflected on a side windshield 5 as illustrated in the FIG. 5, is bent as illustrated with the line C' through the prism 13, which prevents the dial 2a and the like from being recognized on the side windshield. Meanwhile, another optical path D of light is considered which is emitted from the dial 2a and is reflected on the side face 13e to pass the surface 13b and reach the side windshield 5, and is further reflected there to reach the eyes E of the driver. However, the optical path D is not actually generated since the optical path D is absorbed on the side face 13e of the prism 18 which is painted dark.

Since it might be sufficient to paint only the bottom face 13c of the prism 13 with dark color, applying dark color to the side face 13e or the upper face 13f is selectively performed according to the condition.

Next, the second embodiment of the present invention will be explained. Like reference symbols designate like or corresponding parts and the explanation thereof will be omitted.

Figure 6:
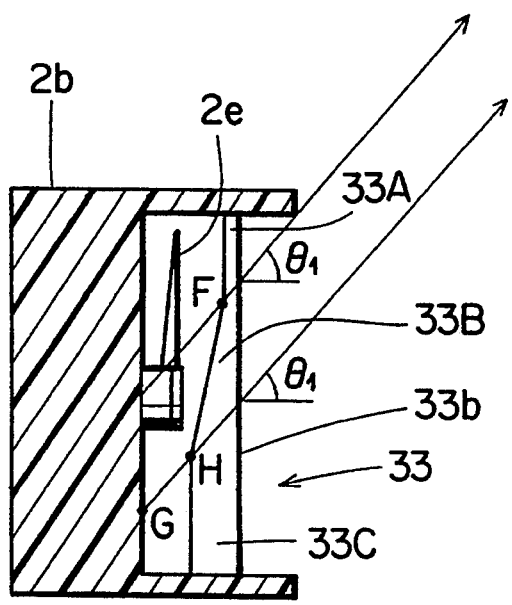
FIG. 6 is a side view of an instrument for a vehicle according to the second embodiment of the present invention.

The instrument for a vehicle according to the second embodiment of the present invention is different from that in shape of the prism the first embodiment as illustrated in FIG. 6. That is, the prism 18 of the first embodiment has a triangular cross section, but, a prism 33 of the second embodiment has an upper portion 33A of a flat plate, a triangular central portion 33B, and a lower portion 33C of a flat plate. The range of the three portions are determined as described below.

The smallest angle formed by a normal line of a surface 33b of the prism 33 and light which is emitted from the dial 2a and passes through the prism 33 to causes an image to be reflected on the windshield 4 is represented $\theta 1$. That is, the light does not reach the driver's eyes at angle smaller than $\theta 1$. Then, we consider a optical path which is in contact with an upper end portion of the instrument case 2b and has the angle $\theta 1$ which is formed with the normal line of the surface of the prism 33, and a point where the optical path crosses a rear face 33a of the prism 33 is described as a point F. A portion from the upper end of the prism 33 to the point F is formed flat as an upper portion 33A. Further, we consider another optical path of light which is emitted with the angle $\theta 1$ from the lowest portion G of the portion of the dial 2a emitting light and a point where the optical path crosses the rear face 33a of the prism is indicated as a point H. Then, an area from the lower portion of the prism 33 to the point H is formed to be a flat plate. Further, a central portion formed between the points F and H is designed to have a trapezoidal cross section. Treatment to end faces of the prism such as applying dark paint is carried out in the same manner as the first embodiment.

Figure 7:
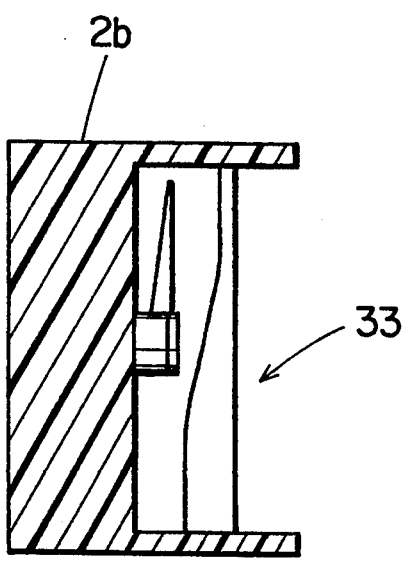
FIG. 7 is a side view of the prism of the FIG. 6 in which a portion thereof is modified.

Forming the prism as described above not only provides almost the same effects as obtained in the first embodiment but also allows the weight of the prism to be decreased, permitting the meter itself to be reduced in weight and thickness. In the prism described above, the dial 2a might be seen from the driver's side as discontinuous at the points F and H. Therefore, as illustrated in FIG. 7, portions where the upper portion 33A of the rear face of the prism 33 and the central portion 33B are connected to each other or the central portion 33B and the lower portion 33C are connected to each other may preferably be formed to have spherical face. The portions with the spherical face have a function as a lens. Therefore, it is preferable that the radius of the face is designed as large as possible or printed portion of the dial 2a is overlapped the spherical portion.

Figure 8:
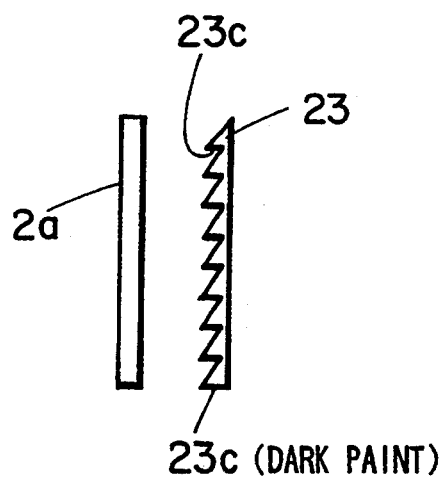
FIG. 8 is a drawing showing a front cover which is formed as a multistage prism.

In the above embodiments, the overall area of the front cover is formed as the wedge prism 13 or only the central portion of the front cover is formed to have a triangular cross section with upper and lower portions thereof being formed as flat plates. The front cover may be formed as multistage prism 23 as described in FIG. 8. In such a case, rear faces 23c each and other end faces are painted dark to interrupt or absorb light.

Next, an instrument for a vehicle according to the third embodiment of the present invention will be explained.

Figure 9:
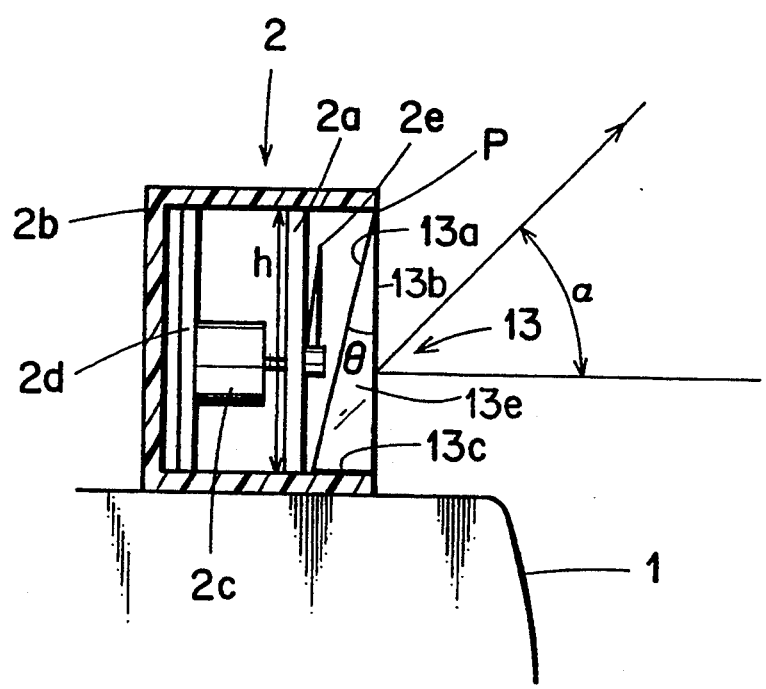
FIG. 9 is a drawing for explaining the relation among the height, apex angle, and thickness of the bottom face of the prism according to the first embodiment.

Under the condition that the surface 13b of the prism and the surface of the dial 2a are arranged so as to be in parallel to each other as described in the first embodiment, the apex angle $\theta$ of the prism is designed to be about 14° when light having more than 45° of angle between a normal line of the surface 13b and the light does not emit from the prism, as exemplarily described in FIG. 9. That is, when the height of the dial 2a is 120 mm, the thickness of the rear face 13c of the prism is determined to be about 30 mm, resulting in considerably thick prism. As a result, not only the weight of the instrument will increase but also wide space for the instrument will be necessary.

Figure 10:
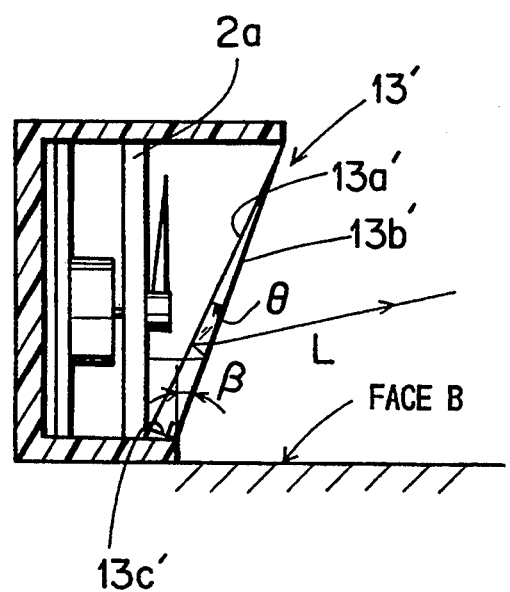
FIG. 10 is a side view of an instrument for a vehicle according to the third embodiment of the present invention.

Therefore, in this embodiment, as illustrated in FIG. 10, the surface of a prism 13' is inclined with upper portion thereof being nearer the driver. If the surface of the prism 13' is disposed so as to be inclined with $\beta=20°$ with respect to the dial 2a, the apex angle of the prism $\theta$ is designed to be 5 when light with more than 45° of an angle with the normal line of the dial 2a. Then, in case that the height of the dial is 120 mm as described above, the thickness of the rear face of the prism 13c' is calculated to be about 11 mm, resulting in considerably thin and light prism.

Further, in the structure described above, the driver observes the face B of the dashboard 1 through area reflection of the surface 13b' and the rear face 13a' of the prism. Therefore, when the face B is formed of good absorbance, it is unnecessary to provide reflection protecting treatment to the front and rear faces 13b', 13a' of the prism 13'. Optical paths of light from the dial 2a which are reflected on the front and rear faces 13b' 13a' should be considered since the optical paths will form double images as illustrated with a line L. To eliminate this problem, it is sufficient to apply a reflection protecting treatment to either the front face or the rear face of the prism 13'. As a result, production cost of the instrument for a vehicle can be reduced since no reflection protecting treatment is required to the prism 13' or only one face may be treated.

Figure 11:
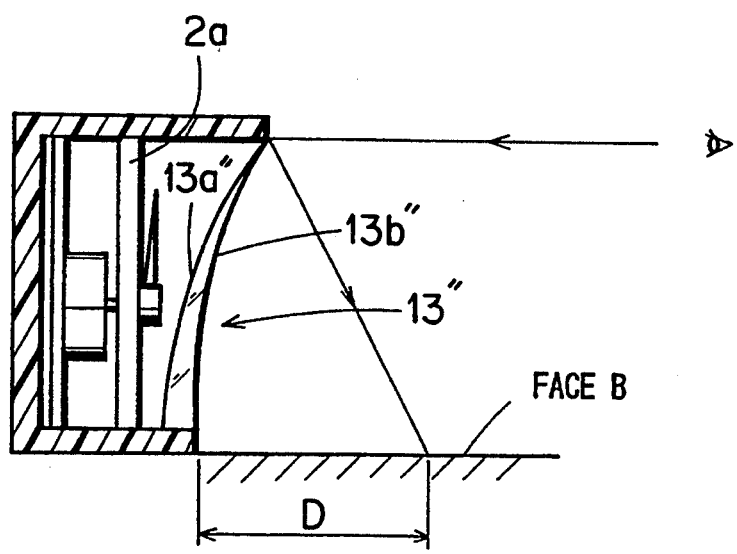
FIG. 11 is a drawing showing the prism of the instrument for a vehicle of FIG. 10 of which shape slightly modified.

Further, as shown in FIG. 11, a front face 13b'' and a rear face 13a'' of a prism 13 may be formed as spherical faces with a center thereof being on the driver's side and the thickness of the prism 13'' is increased as descending from an upper portion to a lower portion thereof. In such a case, it is advantageous that the range of the face B of the dashboard where the driver observes, in other words, distance D from the prism 13'' can be shortened in comparison to that of FIG. 10. In the above embodiments, the instrument for a vehicle is applied to an analog meter, but, the instrument may be applied to a digital meter as a matter of course.

Next, an instrument for a vehicle according to the fourth embodiments of the present invention will be explained.

Figure 12:
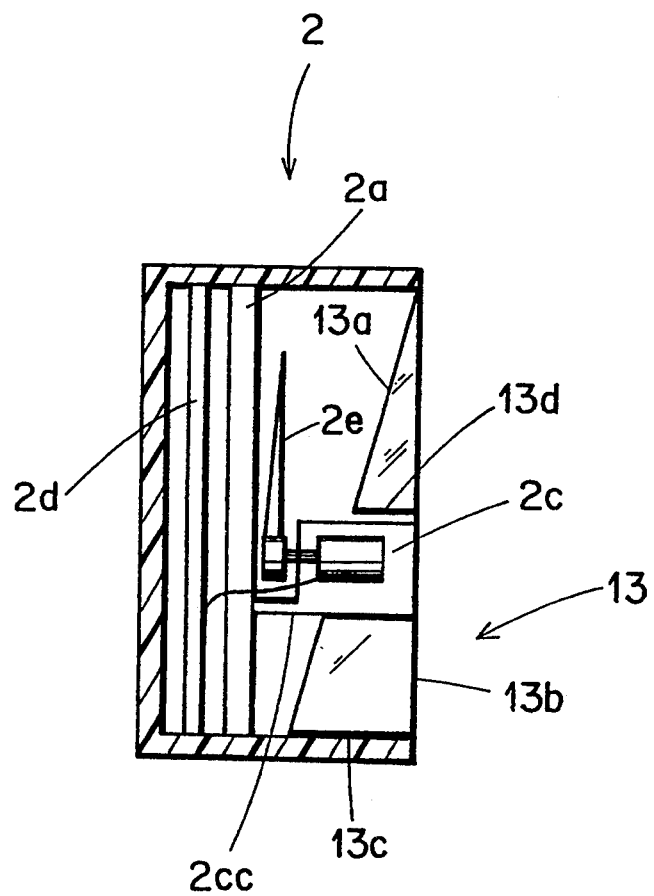
FIG. 12 is a side view of an instrument for a vehicle according to the fourth embodiment of the present invention.
Figure 15:
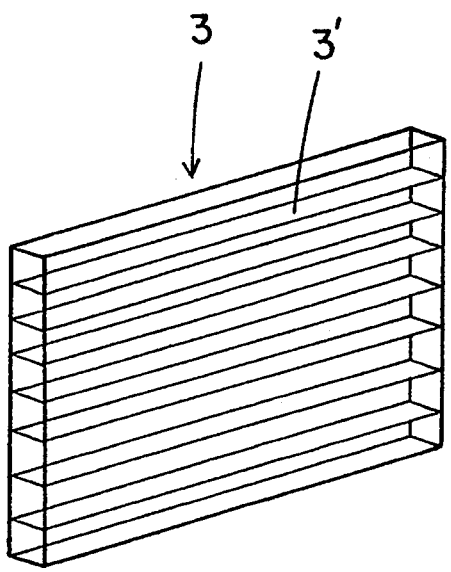
FIG. 15 is a perspective view of a conventional front cover with louvers.
Figure 13:
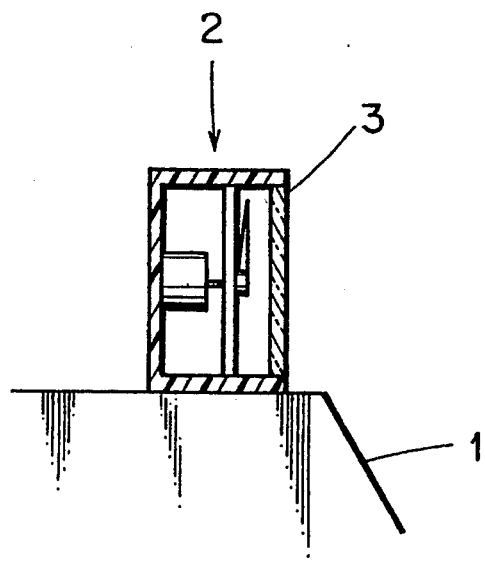
FIG. 13 is a drawing showing a conventional instrument for a vehicle mounted on a dashboard.
Figure 14:
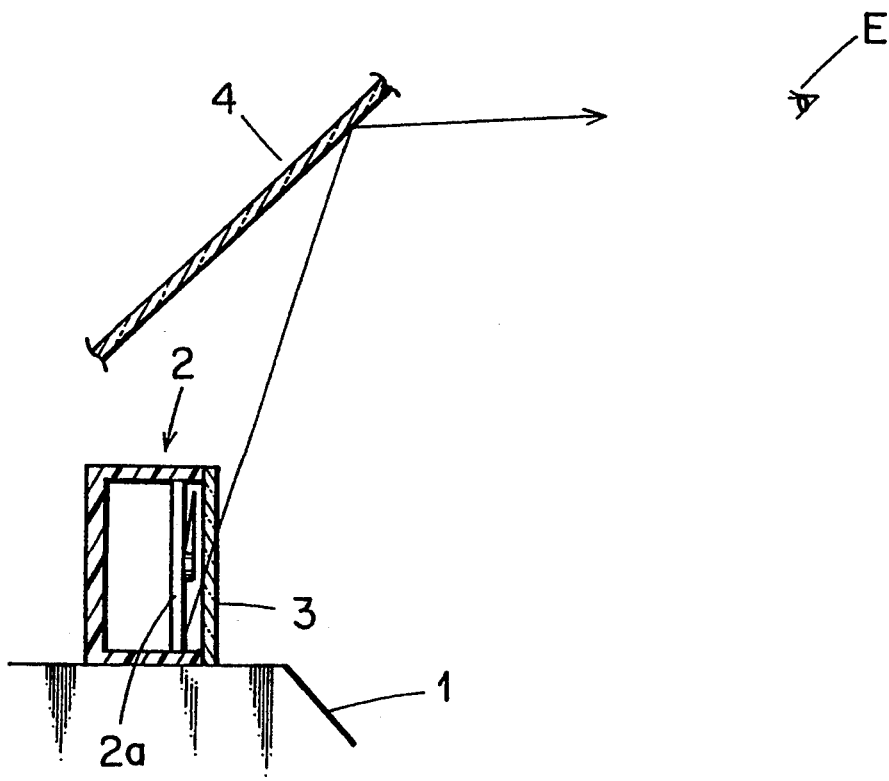
FIG. 14 is a drawing for explaining the condition in which light emitted from a meter reflected on a windshield.

An instrument for a vehicle according to this embodiment is not the same as those according to the previous embodiment. As illustrated in FIG. 12, on a central portion of a prism 13 at a front portion of the instrument is provided a hole from a rear face 13a to a front face 13b. Further, for a pointer 2e of the movement 2c is used a stepping motor or the like, which has a long and narrow shape, and a case 2cc for accommodating the movement 2c is engaged with the hole 13d. That is, the movement 2c is positioned in front of the dial 2a in a way different from the previous embodiment. Power is supplied to the movement 2c with wires from a circuit board 2d disposed behind the dial 2a through the central portion of the dial 2a.

Inner wall of the hole 13d of the prism 13 is painted dark to prevent light emitted from the dial 2a from reflecting on the hole 13d toward the windshield 4.

With the instrument for a vehicle according to the fourth embodiment having the above structure, the same effects as the previous embodiment will be obtained. In addition, the depth of the meter can be decreased through the change in position of the movement 2c to limit the space for the instrument. Since the movement 2c is positioned in front of the dial 2a, paint is preferably be applied to the front face 13b to prevent the movement 2c from being recognized.

As described above, in the instrument for a vehicle according to the present invention, the front cover of the instrument is formed of the prism for bending the emitted light downward, which prevents the reflection at night without decreased luminance of the display in daytime. Further, in the instrument for a vehicle with the hole at the central portion of the prism, the thickness of the meter is deceased besides the above effect. Application of the dark paint to the rear and side faces and the like prevents the reflection on the windshield. Further, the reflection protecting films on the prism prevents images from being formed on the front face of the prism, resulting in improved recognizability.

What is claimed is:

1. An instrument for a vehicle, comprising:
   a meter;
   a case for accommodating said meter;
   a prism means disposed at a front portion of said case for regulating light which is emitted through said prism means upward by bending light emitted from said meter downward, said prism means including a prism which also acts as a front cover of said case;
   said prism having a substantially planar front surface and having a rear surface facing a front surface of said meter, said front surface of said meter having indicia and being located within said case behind said prism and facing said rear surface of said prism, the light emitted from said meter being transmittable from said meter through said rear surface and through said front surface, at least a portion of said rear surface being inclined from said front surface, said front surface and said portion of said rear surface being closer together at an upperside of said portion of said rear surface than at a bottom of said portion of rear surface such that at least a portion of said prism tapers towards the upperside of the prism; and means for absorbing light incident on a bottom face of said prism which includes that said bottom face is made dark.

2. An instrument for a vehicle as claimed in claim 1, wherein upper and lower portions of said prism located above and below said portion of said prism which tapers towards the upperside, respectively, are formed as flat plates.

3. An instrument for a vehicle as claimed in claim 1, wherein said front surface of said prism is forwardly inclined from the meter with an upper portion thereof being nearer a driver.

4. An instrument for a vehicle, comprising:
a meter;
a case for accommodating said meter;
a prism disposed at a front portion of said case for regulating light which is emitted from said prism upward by bending light emitted from said meter downward, said prism also acting as a front cover of said case;
wherein front and rear faces of said prism are spherical with centers on a front side of the instrument at the side of a driver; and
wherein the thickness of said prism is increased as descending from an upper portion to a lower portion thereof.

5. An instrument for a vehicle as claimed in claim 3 or 4, wherein said instrument is mounted on a flat face and a surface of said flat face opposing said front cover of the case is made of material with good light absorbance.

6. An instrument for a vehicle comprising:
a meter;
a case for accommodating said meter;
a prism disposed at a front portion of said case for regulating light which is emitted from said prism upward by bending light emitted from said meter downward, said prism also acting as a front cover of said case;
said meter includes a dial, a pointer disposed on said dial, and a movement for driving said pointer, and a hole is formed at a central portion of said prism from a rear face to a front face thereof to accommodate said movement.

7. An instrument for a vehicle as claimed in any one of claims 1, 2, 3, 4, or 6 wherein all outer side faces of said prism are painted dark.

8. An instrument for a vehicle as claimed in any one of claims 1, 2, or 3 wherein reflection protecting films are applied to said front and rear surfaces of said prism.

9. An instrument according to claim 1, wherein said prism has a substantially triangular cross-section.

10. An instrument according to claim 1, wherein said front surface of said meter is a generally vertical surface.

11. An instrument according to claim 1, in combination with a dashboard of a vehicle upon which said instrument is mounted.

12. An instrument according to claim 10, in combination with a dashboard of a vehicle upon which said instrument is mounted.

13. An instrument according to claim 1, wherein said indicia on said front surface of said meter includes a dial.

14. An instrument according to claim 1, wherein said prism is a multistage prism and wherein said at least a portion of said prism which tapers towards the upperside is a first stage of said multistage prism, and wherein each other stage of said multistage prism is tapered in the manner of said first stage.

15. An instrument according to claim 14, wherein each of said stages has a generally horizontal lower surface which is made dark.

16. An instrument according to claim 10, wherein said front surface of said prism is substantially in parallel to said generally vertical surface of said meter.

17. An instrument for a vehicle as claimed in any one of claims 4 or 6 wherein reflection protecting films are applied to said front and rear faces of said prism.

* * * * *